United States Patent
Blanton et al.

(10) Patent No.: US 8,095,304 B2
(45) Date of Patent: Jan. 10, 2012

(54) CARGO TRACKING AND VISIBILITY SYSTEM AND METHOD

(75) Inventors: W. Brendan Blanton, Wilmington, DE (US); Javier Cortez, Glen Carbon, IL (US); Gary Koval, Troy, IL (US); Lester L. Houston, III, Florissant, MO (US); Leroy Elleby, Jr., Fairview Heights, IL (US); Herbert D. Thompson, Landenberg, PA (US)

(73) Assignee: The Boeing Company, Chicago, IL (US)

( * ) Notice: Subject to any disclaimer, the term of this patent is extended or adjusted under 35 U.S.C. 154(b) by 610 days.

(21) Appl. No.: 12/165,062

(22) Filed: Jun. 30, 2008

(65) Prior Publication Data

US 2009/0326808 A1    Dec. 31, 2009

(51) Int. Cl.
*G01C 21/36* (2006.01)
*G06Q 10/00* (2006.01)

(52) U.S. Cl. ............... 701/207; 701/213; 705/34

(58) Field of Classification Search .......... 701/207, 701/201, 213, 211; 705/34, 11, 26, 28, 333, 705/6; 715/777, 780
See application file for complete search history.

(56) References Cited

U.S. PATENT DOCUMENTS

| | | | | |
|---|---|---|---|---|
| 5,828,322 A * | 10/1998 | Eberhard | | 340/988 |
| 6,208,910 B1 | 3/2001 | Michael et al. | | |
| 7,339,460 B2 * | 3/2008 | Lane et al. | | 340/438 |
| 7,685,953 B2 * | 3/2010 | Giles | | 114/72 |
| 7,848,663 B2 * | 12/2010 | Okano | | 399/13 |
| 2001/0018628 A1 * | 8/2001 | Jenkins et al. | | 701/35 |
| 2003/0135304 A1 * | 7/2003 | Sroub et al. | | 701/1 |
| 2005/0216119 A1 | 9/2005 | Hamilton | | |
| 2009/0055232 A1 * | 2/2009 | Bruno et al. | | 705/7 |

FOREIGN PATENT DOCUMENTS

DE    195 16 696 A1    11/1996

OTHER PUBLICATIONS

International Search Report for PCT/US2009/044177 mailed Oct. 20, 2009.

\* cited by examiner

*Primary Examiner* — Tan Q Nguyen
(74) *Attorney, Agent, or Firm* — Alston & Bird LLP

(57) ABSTRACT

A cargo load and visibility system and method as well as an associated delivery vehicle tracking system are provided to permit cargo to be tracked, both as the cargo is loaded upon the delivery vehicle and throughout the delivery process, thereby increasing the visibility of the shipping operations including the last stage of the shipping operations in which the goods are delivered to their intended or ultimate destination. The cargo load and visibility system and method may be configured to permit redirection of the delivery vehicle while in route in instances in which the intended destination, such as a military unit, has changed position if such redirection can be performed in a manner that is safe for the delivery vehicle.

23 Claims, 6 Drawing Sheets

CARGO TRACKING AND VISIBILITY SYSTEM AND METHOD

FIELD OF THE INVENTION

Embodiments of the present invention relate generally to systems and methods for tracking cargo and, more particularly, to systems and methods for tracking cargo and for utilizing state data associated with a delivery vehicle in order to permit the intelligent redirection of the delivery vehicle, such as in light of changing circumstances.

BACKGROUND OF THE INVENTION

An immense amount of goods is in the process of being shipped each day. In this regard, the goods may be in the process of being loaded onto a vehicle, into a container or the like for shipment. The goods may be onboard a delivery vehicle, such as an aircraft, cargo ship or the like, for transport to or at least toward the intended destination or, the goods may be at or proximate the intended destination and waiting to be or in the process of being unloaded, unpacked or the like.

It is useful for many reasons to be able to accurately track cargo during its shipment. By tracking the cargo, accountability and a chain of custody for the cargo can be maintained. Additionally, by having an understanding of the cargo that is in shipment to an intended destination, the intended destination is better able to manage its inventory in order to have the necessary products on hand when needed, but to avoid having unnecessarily large supplies of products prior to their use. Additionally, by understanding the status of goods that are in shipment to an intended destination, the propensity to re-order goods that have been previously been ordered, but have not yet arrived at the intended destination can be reduced. As a result, accurately tracking the shipment of goods can increase the efficiency with which inventory can be managed and correspondingly decrease the costs associated with inventory management.

The capability to accurately track the shipment of goods is particularly important and also particularly challenging in a military context. As will be understood, military engagements can require goods to be shipped to various locations around the world including a number of intended destinations that are relatively remote. Additionally, conventional shipping operations are further complicated by the manner in which at least some military engagements are being conducted and the manner in which it is anticipated that even more military engagements will be conducted in the future in terms of the transformation to an ad-hoc light structure in which the military is less reliant on the existing infrastructure and is, instead, adapted to move quickly from location to location as the military theater evolves. In this scenario, the process of providing supplies to the military and, in particular, the process of shipping the supplies over the last leg of the journey to military forces in the field becomes even more challenging with increasingly greater reliance likely to be made upon rapid, vertical lift re-supply techniques, i.e., the use of helicopters or the like, for delivering supplies to the military personnel since the existing infrastructure may not permit the delivery of supplies to the military personnel in the field, at least not in a safe manner.

By way of example, the Government Accounting Office has determined that the Department of Defense has a supply system that delivers supplies valued at about a 150 billion dollars per year. Within this supply system, at all times, supplies valued at about 86 billion dollars are in the supply chain pipeline, i.e., are in the process of being shipped from their source to the intended destination and/or are disposed in inventory at some intermediate location. Of the assets in the supply chain pipeline, the Government Account Office has estimated that the Department of Defense has no visibility for supplies valued at about 27 billion dollars. In addition to difficulties in tracking supplies, inventory management also poses an issue, at least partially due to the lack of visibility within the supply chain. In this regard, the Government Accounting Office estimates that an average of 65% of on-hand inventory, i.e., inventory valued a about 18.7 billion dollars, was not needed to support required inventory levels. As evidenced by the information provided by the Government Accounting Office, the difficulties with the supply chain including the lack of visibility thereof cause military personnel to find themselves with too much of one type of asset, but not enough of another type of asset. Additionally, the military may be tempted to repeatedly order the same asset since there is significant difficulty or limitation in the ability to determine where or if a previously ordered asset is within the supply chain. These repeated orders significantly decrease the efficiency of the supply system and increase the burden on the transportation system that supports the supply chain.

In a tactical and, in particular, in the modern tactical theatre in which the military personnel in the field are less reliant upon the existing infrastructure and are deployed in a more ad-hoc fashion, it is becoming increasingly more common for supplies that are in the last stage of the supply system, i.e., the leg of the supply chain that delivers these supplies to the military personnel in the field, to need to be redirected since the military personnel have moved or the plans for the military personnel have changed since the time of the order. In these situations, it has been difficult to redirect the supplies since the lack of transparency within the supply chain made it difficult to determine where the supplies currently were and it was oftentimes similarly difficult to determine who in the supply chain was currently responsible for the supplies.

As such, it would be desirable to provide for an improved supply system, both in the commercial context and the military context. In particular, it would be desirable to provide for a supply system that was more visible such that the status of supplies that had been previously ordered could be readily determined. Additionally, it would be desirable to provide for an improved supply system that would be capable of supporting more ad-hoc military operations that are less reliant on existing infrastructure, while also permitting the redirection of supplies in instances in which the military personnel has or is changing locations.

BRIEF SUMMARY OF THE INVENTION

A cargo load and visibility system and method as well as an associated delivery vehicle tracking system are therefore provided to permit the cargo to be tracked, both as the cargo is loaded upon the delivery vehicle and throughout the delivery process, thereby increasing the visibility of the shipping operations including the last stage of the shipping operations in which the goods are delivered to their intended or ultimate destination. Further, the cargo load and visibility system and method are configured to advantageously permit redirection of the delivery vehicle while in route in instances in which the intended destination, such as a military unit, has changed position if such redirection can be performed in a manner that is safe for the delivery vehicle. Accordingly, the cargo load and visibility system and method of embodiments of the present invention provide for efficient and effective shipping operations including in instances in which the goods are to be delivered to ad-hoc military units that are subject to frequent re-deployment and do not enjoy the benefits of existing infrastructure.

In accordance with one aspect of the present invention, a cargo load and visibility system is provided that includes a delivery vehicle tracking system. The delivery vehicle tracking system includes a reader unit, such as a contactless reader, mounted upon the delivery vehicle and configured to identify cargo as the cargo is loaded on or unloaded from the delivery vehicle. In instances in which the delivery vehicle includes a loading ramp, the reader unit may be positioned in an overhead position proximate the loading ramp. The delivery vehicle tracking system also includes a processor configured to receive information from the reader unit identifying the cargo loaded upon or unloaded from the delivery vehicle in order to facilitate a determination of the cargo currently onboard the delivery vehicle. The delivery vehicle tracking system also includes a transmitter, in communication with a processor, configured to transmit information regarding the position of the delivery vehicle and state data including information from which an amount of fuel carried by the delivery vehicle or the remaining range of the delivery vehicle is determinable. For example, the transmitter of the delivery vehicle tracking system may be configured to transmit the mission phase, the weight and/or the remaining fuel onboard the delivery vehicle.

A cargo load and visibility system of this embodiment also includes a remote cargo management system that includes a receiver configured to receive the information from the transmitter of the delivery vehicle and a transmitter configured to transmit re-tasking instructions to the delivery vehicle in order to redirect the delivery vehicle at least partially based upon the state data provided by the delivery vehicle. The remote cargo management system may also include a processor configured to determine if an alternate destination is within the remaining range of the delivery vehicle based upon the state data and, if the alternate destination is within the remaining range of the delivery vehicle, to direct the transmitter of the remote cargo management system to transmit re-tasking instructions redirecting the delivery vehicle to the alternative destination. The remote cargo management system may also include a display configured to present a map and indicia indicating the position of the delivery vehicle.

The processor of the delivery vehicle tracking system may be further configured to receive a cargo manifest identifying the cargo to be carried by the delivery vehicle and to determine any discrepancy between the cargo manifest and the cargo currently onboard the delivery vehicle based upon the information provided by the reader unit. The processor of the delivery vehicle tracking system may also be configured to provide information regarding placement of the cargo upon the delivery vehicle based upon the cargo manifest.

In another aspect of the present invention, a delivery vehicle tracking system is provided that includes a reader unit, such as a contactless reader unit, mounted upon the delivery vehicle for identifying cargo as the cargo is loaded on or unloaded from the delivery vehicle. In instances in which the delivery vehicle includes a loading ramp, the reader unit may be positioned in an overhead position proximate the loading ramp. The delivery vehicle tracking system of this embodiment also includes a processor for receiving a cargo manifest identifying the cargo to be carried by the delivery vehicle and the information from the reader unit identifying the cargo loaded on or unloaded from the delivery vehicle. The processor is therefor configured to determine any discrepancy between the cargo manifest and the cargo currently onboard the delivery vehicle based upon the information provided by the reader unit. The processor may also be configured to provide information regarding placement of the cargo upon the delivery vehicle based upon its cargo manifest. The delivery vehicle tracking system also includes a transmitter, in communication with the processor, for transmitting information regarding a position of the delivery vehicle and state data including information from which an amount of fuel carried by the delivery vehicle or the remaining range of the delivery vehicle is determinable.

The delivery vehicle tracking system can also include a receiver configured to receive re-tasking instructions that re-direct the delivery vehicle. The re-tasking instructions may be at least partially based on the state data provided by the transmitter. In this regard, the transmitter may be configured to transmit state data selected from the group consisting of the mission phase, the weight and the remaining fuel onboard the delivery vehicle.

In accordance with another aspect of the present invention, a method of tracking cargo is provided in which cargo is identified with a reader unit mounted upon a delivery vehicle as the cargo is loaded on or unloaded from the delivery vehicle. In this regard, the cargo may be identified with the reader unit in a contactless manner. To facilitate the loading process, the method may optionally provide information regarding placement of the cargo upon the delivery vehicle based upon the cargo manifest. The method of this embodiment also determines the cargo currently onboard the delivery vehicle based upon the cargo identified by the reader unit as the cargo is loaded on or unloaded from the delivery vehicle. The method also determines any discrepancy between the cargo manifest and the cargo currently onboard the delivery vehicle based upon the information provided by the reader unit. Further, the method transmits information regarding the position of the delivery vehicle and state data including information from which an amount of fuel carried by the delivery vehicle or the remaining range of the delivery vehicle is determinable. In addition, the cargo may also be identified as the cargo is unloaded from the delivery vehicle upon reaching its destination.

The method may also include the receipt of re-tasking instructions that re-direct the delivery vehicle. In this regard, the re-tasking instructions may be at least partially based upon the state data provided by the delivery vehicle. In this regard, the state data may include one or more of the mission phase, the weight and/or the remaining fuel onboard the delivery vehicle, which may assist in a determination as to the advisability of any potential redirection of the delivery vehicle.

Accordingly, a cargo load and visibility system and method are provided which permit the efficient shipment of goods with increased visibility, even over the last stage of the shipping operation. Moreover, the cargo load and visibility system and method permit the redirection of cargo during its shipment if such redirection can be safely accomplished, thereby providing for the effective and efficient shipment of goods to various intended destinations that may change from time-to-time, such as ad-hoc military units whose positions may be quickly changed.

BRIEF DESCRIPTION OF THE DRAWING(S)

Having thus described the invention in general terms, reference will now be made to the accompanying drawings, which are not necessarily drawn to scale, and wherein:

DETAILED DESCRIPTION OF THE INVENTION

The present inventions now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Figure 1:
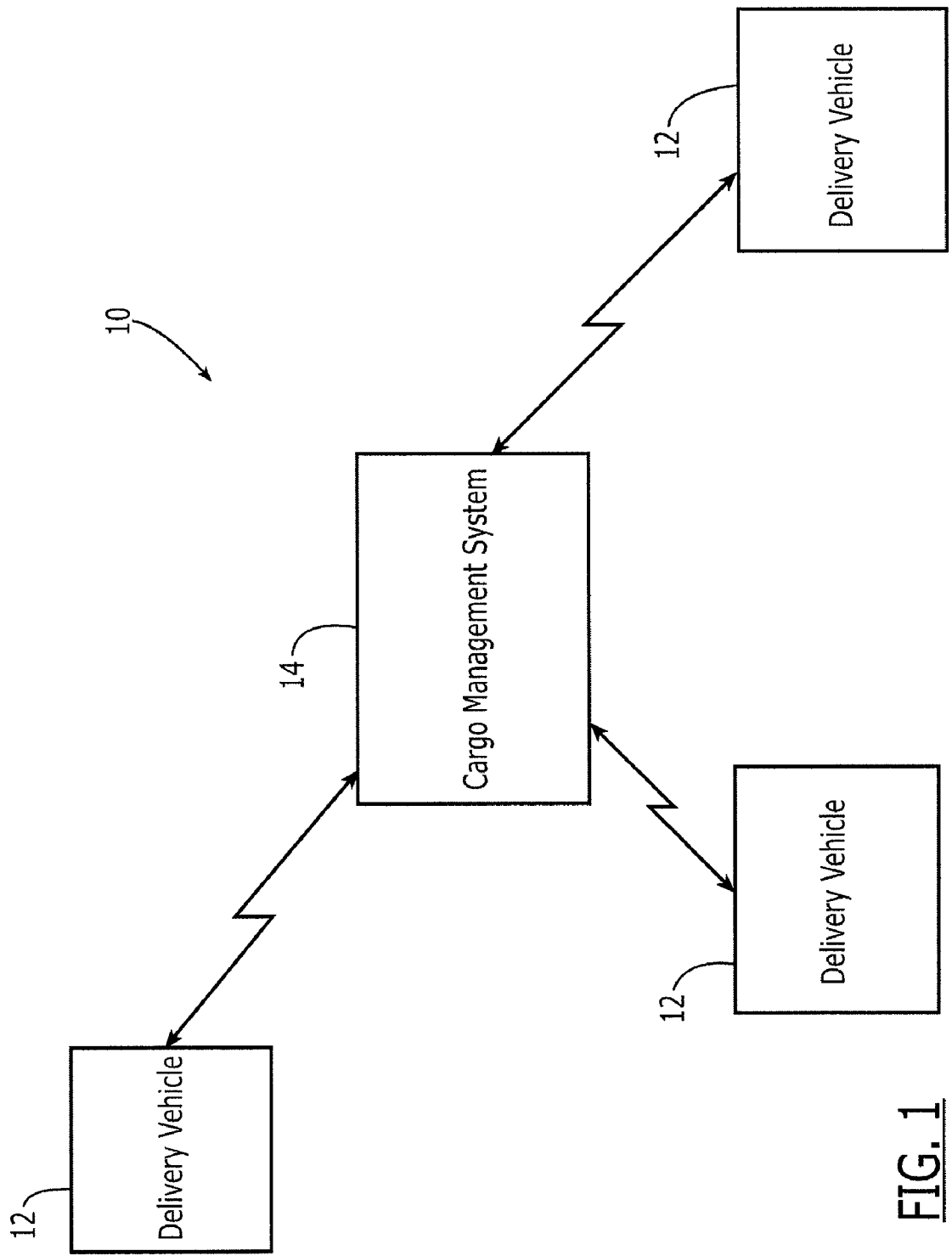
FIG. 1 is a block diagram of a cargo load and visibility system according to one embodiment of the present invention.
Figure 2:
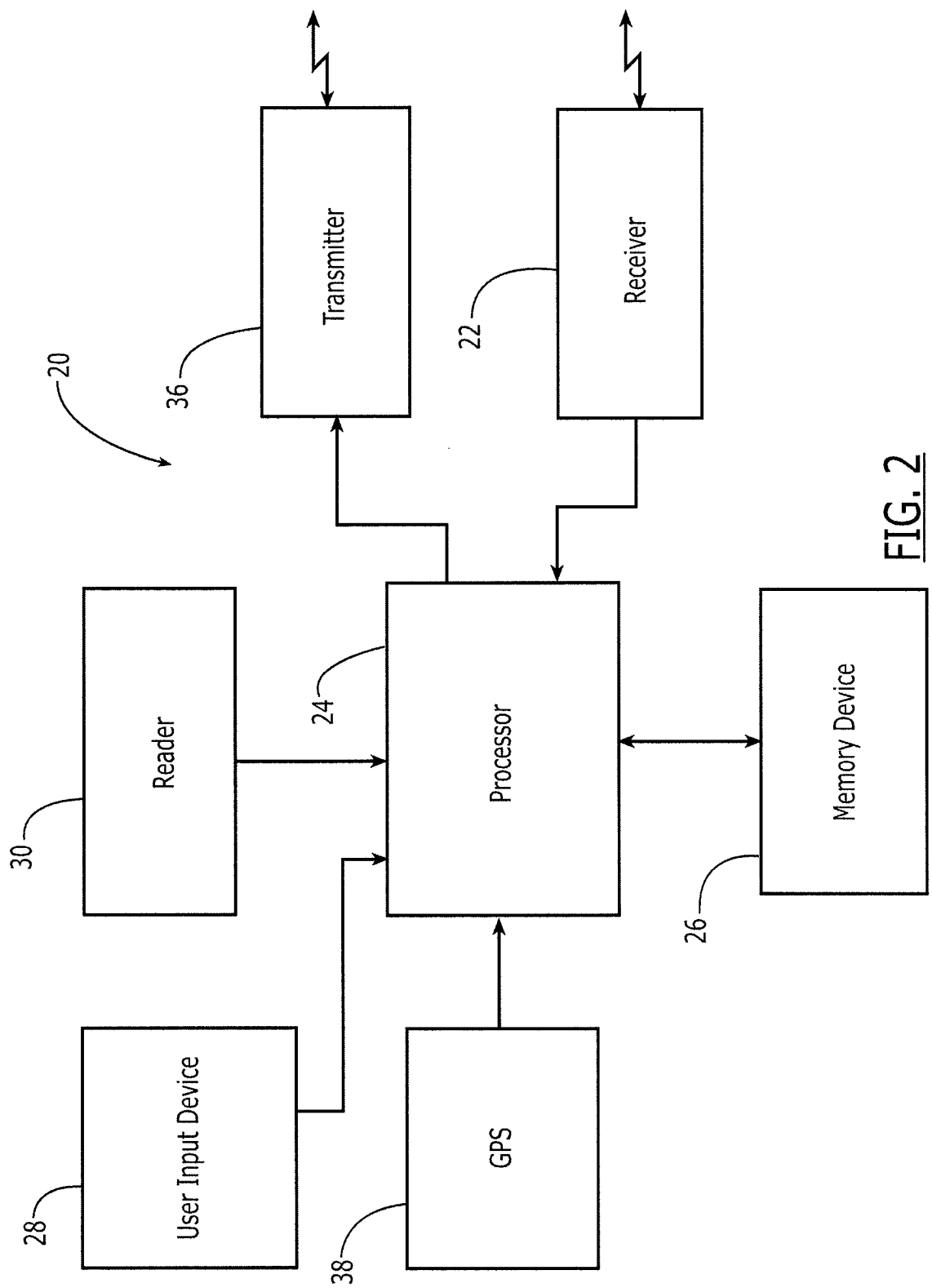
FIG. 2 is a block diagram of a delivery vehicle tracking system according to one embodiment of the present invention.

Referring now to FIG. 1, a cargo load and visibility system 10 in accordance with one embodiment to the present invention is depicted. Although described hereinafter in conjunction with the delivery of supplies in a military context and, in particular, in a context of ad-hoc military operations which rely less on existing infrastructure than conventional military operations, the cargo load and visibility system can be employed in conjunction with other shipping operations including, for example, commercial shipping operations. Additionally, the cargo load and visibility system will be primarily described in conjunction with the last stage or leg of the supply operation that delivers the supplies to their intended destination. However, the cargo load and visibility system can be employed in conjunction with other stages of the supply operations, if so desired.

As shown, in FIG. 1, a cargo load and visibility system 10 includes one or more delivery vehicles 12 in communication with a remote cargo management system 14. The delivery vehicles will be primarily described hereinafter as helicopters or other airborne vehicles. In this regard, and as particularly advantageous in conjunction with the delivery of supplies in the context of an ad-hoc military operation, delivery vehicles that are capable of vertical takeoff and landing, such as helicopter, and/or vehicles capable of relatively short takeoffs and landing, particularly on less conventional airstrips, can advantageously serve as the delivery vehicles. In other context, however, other types of delivery vehicles may be employed.

The cargo that is to be loaded upon a delivery vehicle 12, and, in turn, delivered to an intended destination will be generally described herein in terms of goods. However, the cargo may also be people, e.g., passengers, that are being transported to the intended destination. As such, the following discussion regarding the transportation of goods is also applicable to the transportation of people. In one embodiment, the goods that are to be loaded upon the delivery vehicle are identified by a cargo manifest that identifies each of the goods, such as by name, identifier number or the like, as well as the quantity of each of the goods that are to be loaded upon the delivery vehicle and the intended destination of each of the goods. In this regard, all of the goods that are loaded upon a delivery vehicle may be intended for the same destination or the goods loaded upon a delivery vehicle may be intended to be delivered to two or more destinations. As such, the cargo manifest that is provided to the delivery vehicle identifies the goods, the quantity of goods and the intended destinations of the goods. While the cargo manifest may be provided in paper form for review and use by an individual supervising the loading of the delivery vehicle, the cargo manifest may also be provided in electronic form. As such, the delivery vehicle may include a delivery vehicle tracking system 20 that includes a receiver 22 for receiving a cargo manifest. In this regard, the receiver may be configured to communicate with a network, such as a wireline or wireless network for receiving the cargo manifest. The delivery vehicle tracking system may also include a processor 24, such as a computer, a controller, a microprocessor or other type of computing device, in communication with the receiver for receiving the cargo manifest from the receiver and for storing the cargo manifest in an associated memory device 26.

As the goods are loaded upon the delivery vehicle 12, an identification of each of the goods and the quantity of each of the goods may be provided to the processor 24 for comparison with the cargo manifest and also for storage by the memory device 26. See, for example, block 40 of FIG. 4 which depicts the operations performed by the delivery vehicle tracking system 20 of one embodiment. The information regarding the goods loaded upon the delivery vehicle can be provided in various manners. In one embodiment, a keyboard, touchscreen and/or other user input device 28 is provided via which an individual supervising or participating in the loading of the delivery vehicle inputs information identifying the goods loaded upon the delivery vehicle as well as the quantity of the goods loaded upon the delivery vehicle. This information provided via the user input device is then provided to the processor for comparison with the cargo manifest and storage by the associated memory device.

Figure 3:
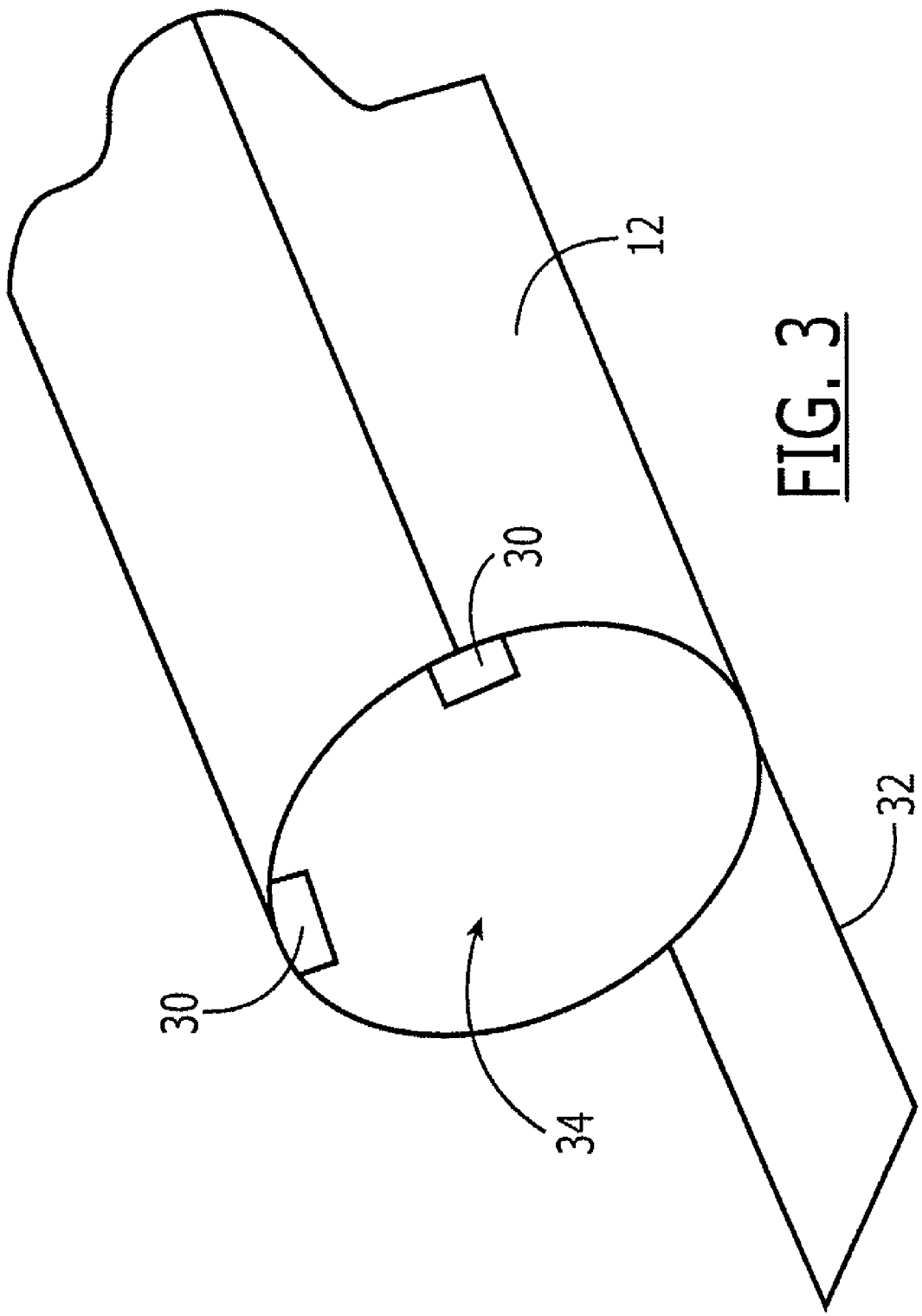
FIG. 3 is a graphical representation of the placement of a reader unit of a delivery vehicle tracking system of one embodiment of the present invention relative to a loading ramp of the delivery vehicle in order to permit the contactless identification of the cargo as the cargo is loaded onto or unloaded from the delivery vehicle.

In one advantageous embodiment, each or at least a number of the goods include an electronic identification tag, such as a barcode tag, a radio frequency identification (RFID) tag or the like. In this embodiment, the delivery vehicle tracking system 20 can include a reader unit 30 for reading the electronic identification tag associated with and carried by each of the goods as the goods are loaded upon the delivery vehicle 12. For example, a number of the goods may include RFID tags and the delivery vehicle tracking system may include an RFID tag reader unit mounted proximate the portal via which the goods are loaded. In the embodiment depicted in FIG. 3 in which the delivery vehicle, such as a helicopter, includes a loading ramp 32 via which the goods enter the cargo hold 34 of the delivery vehicle, the delivery vehicle tracking system may include one or more RFID reader units positioned in an overhead location adjacent the loading ramp in order to reliably read most, if not all, of the RFID tags carried by the goods as the goods are loaded upon the delivery vehicle. In this embodiment, the reader unit(s) can also be in communication with the processor 24 for providing information identifying each of the goods as well as the number of the goods that are loaded upon the delivery vehicle to the processor for comparison by the processor with the cargo manifest and for storage in the associated memory device 26.

Figure 4:
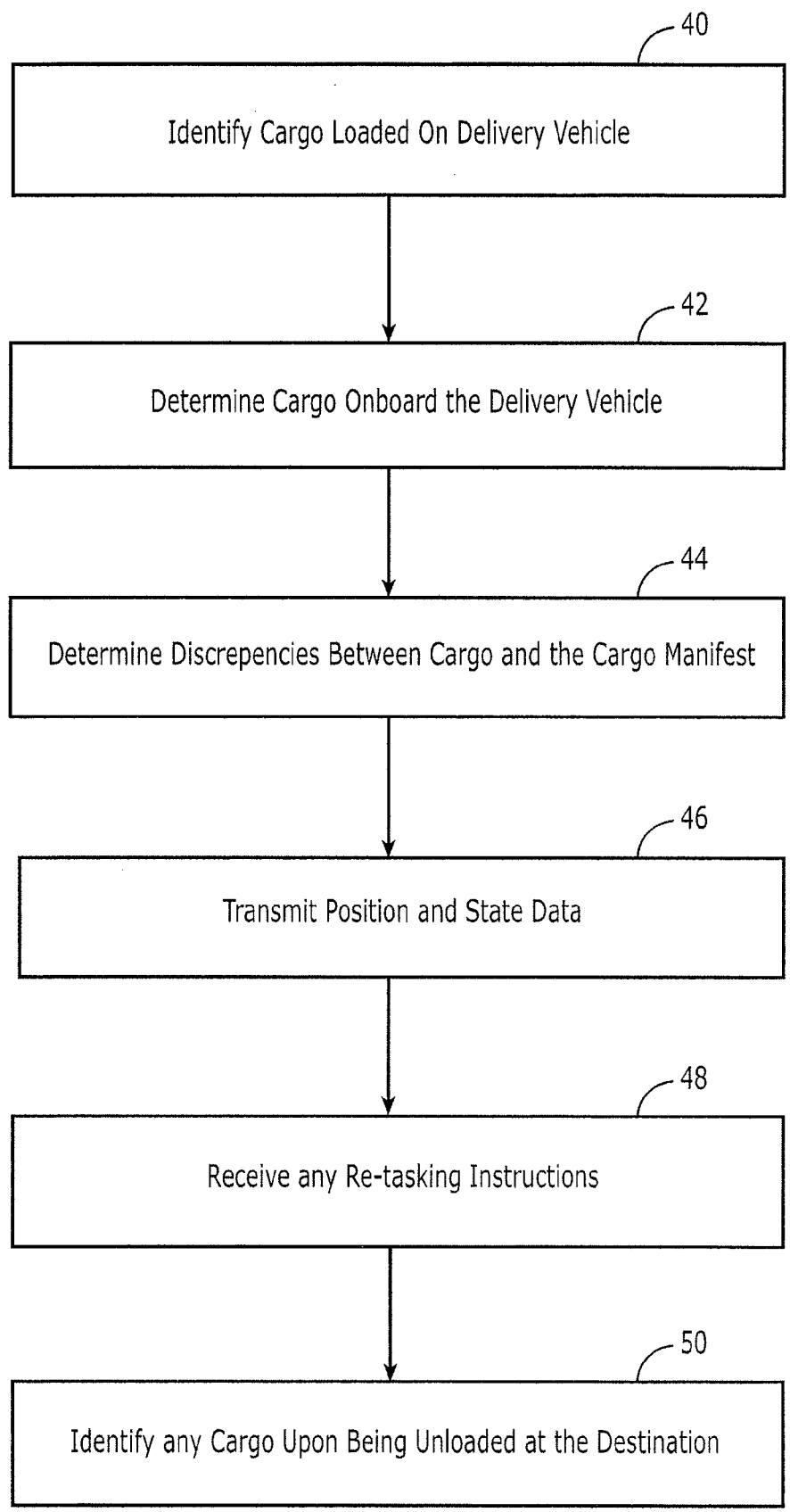
FIG. 4 is a flowchart of the operations performed by a delivery vehicle tracking system in accordance with one embodiment of the present invention.

Regardless of the manner in which the cargo loaded on or unloaded from the delivery vehicle is identified, the processor 24 of the cargo delivery tracking system 20 can determine the cargo that is onboard the delivery vehicle 12, as shown in block 42 of FIG. 4. Thereafter, by comparing the goods that loaded upon the delivery vehicle with the cargo manifest, the processor can identify goods that have been inadvertently loaded upon the delivery vehicle, in this regard, the processor can determine discrepancies between the cargo and the cargo manifest, such as by identifying goods that have been inadvertently loaded upon the delivery vehicle as well as goods loaded upon the delivery that are not included in the cargo manifest. See block 44 of FIG. 4. As such, the goods that have been inadvertently loaded upon the delivery vehicle can be located and removed from the delivery vehicle, thereby permitting the goods to be delivered, instead, to the proper location and to avoid the goods that have been inadvertently loaded upon the delivery vehicle from consuming valuable cargo space and disadvantageously increasing the weight of the delivery vehicle.

As part of determining discrepancies with respect to the cargo manifest, the processor 24 of the delivery vehicle tracking system 20 can identify those goods that are loaded upon the delivery vehicle 12 that also are included in the cargo manifest such that either throughout the loading process or upon the completion of the loading process, the processor can identify any other goods that appear upon the cargo manifest and which should therefore be loaded upon the delivery vehicle, but which have not yet been loaded upon the delivery vehicle. As such, goods which are scheduled to be delivered, but which have not yet been loaded, can be located and loaded upon the delivery vehicle prior to departure of the delivery vehicle such that all of the goods or at least as many of the goods as practical that are listed in the cargo manifest are loaded upon the delivery vehicle in preparation for delivery to the intended destination, thereby increasing the efficiency of the shipping process. Additionally, by identifying the goods as the goods are loaded upon the delivery vehicle and by storing the information identifying the goods loaded upon the delivery vehicle, the processor maintains visibility of the goods during the shipping process by permitting the goods to be located and tracked in a precise fashion, even during the last stage of the shipping process.

The cargo manifest may not only identify the goods, the quantity of the goods and the intended destinations of the goods, but the cargo manifest or other information provided to the delivery vehicle 12 may provide loading instructions that identify the relative order in which the goods are to be loaded and the relative placement of the goods within the cargo bay 34 of the delivery vehicle. In this regard, the goods may be destined for several different intended destinations. Based up the route to be traveled by the delivery vehicle and the order in which the goods are to be delivered, the information provided to the delivery vehicle may direct that the goods that are to be unloaded at the final destination should be loaded first and therefore be least accessible, while the goods that are to be delivered to the initial destination should be loaded last and would therefore be most accessible upon reaching the initial destination. Additionally, it may be advantageous for the operation of the deliver vehicle to have the weight of the cargo to be distributed in a predefined manner, thereby facilitating the flight or other operations of the delivery vehicle and/or insuring that fuel is consumed in an efficient manner. As such, the cargo manifest or other information provided to the delivery vehicle may not only identify the goods, the quantity of goods and their intended destination, but may also identify the relative location within the cargo bay that the goods should be placed such that the delivery vehicle will have a desired weight distribution, such as by being evenly distributed or distributed in some other desirable fashion.

In addition to the cargo manifest, the delivery vehicle 12 and, in particular, the processor 24 of the delivery vehicle tracking system 20 can be provided with delivery instructions identifying the route to be traveled, e.g., flown, and the goods to be delivered at each of one or more intended destinations. Once the goods identified by the cargo manifest or at least as many of the goods identified by the cargo manifest as practical, have been loaded upon the delivery vehicle, the delivery vehicle may depart in accordance with the delivery instructions.

The delivery vehicle tracking system 20 also generally includes a transmitter 36 in communication with the processor 24 for providing information from the delivery vehicle 12 to the cargo management system 14 as shown in FIG. 1 and in block 46 of FIG. 4. In this regard, the delivery vehicle and the cargo management system may be connected via one or more networks, such as a wireline network, a wireless network or the like. The delivery vehicle, and, in particular, the processor in combination with the transmitter can provide the information to the cargo management system regarding the cargo that has been loaded upon the delivery vehicle including, for example, a report regarding any discrepancies between the cargo onboard the delivery vehicle and the cargo manifest (to which the cargo management system also generally has access). The delivery vehicle may also include a position-determining system, such as a GPS system 38, for identifying the current location of the delivery vehicle and for providing the current location to the processor for transmission via the transmitter to the cargo management system. As such, the cargo management system can follow the path of the delivery vehicle and, in turn, the cargo loaded upon the delivery vehicle.

Additionally, the processor 24 of the delivery vehicle tracking system 20 in combination with the transmitter 36 can be configured to provide state data to the cargo management system 14 representative of the current state of the delivery vehicle 12. The processor can be configured to provide a variety of different state data including data defining the weight of the delivery vehicle, the current fuel onboard the delivery vehicle, the configuration of the vehicle (e.g., number of seats for passengers, pallet loading/unloading system, etc.) and the mission phase of the delivery vehicle. As such, the delivery vehicle can include a variety of sensors, including fuel gauges, in order to provide at least some of the state data to the processor for communication via the transmitter to the cargo management system. Additionally or alternatively, the processor can monitor the data bus of the delivery vehicle in order to obtain state data as reported by various sensors. In an instance in which the delivery vehicle is an aircraft, the processor may monitor the data bus of the aircraft to determine, among other parameters, the "weight on wheels" as reported by the landing gear sensors and/or the landing gear avionics. Other state data may be provided by the user input device 28 to the processor.

Figure 5:
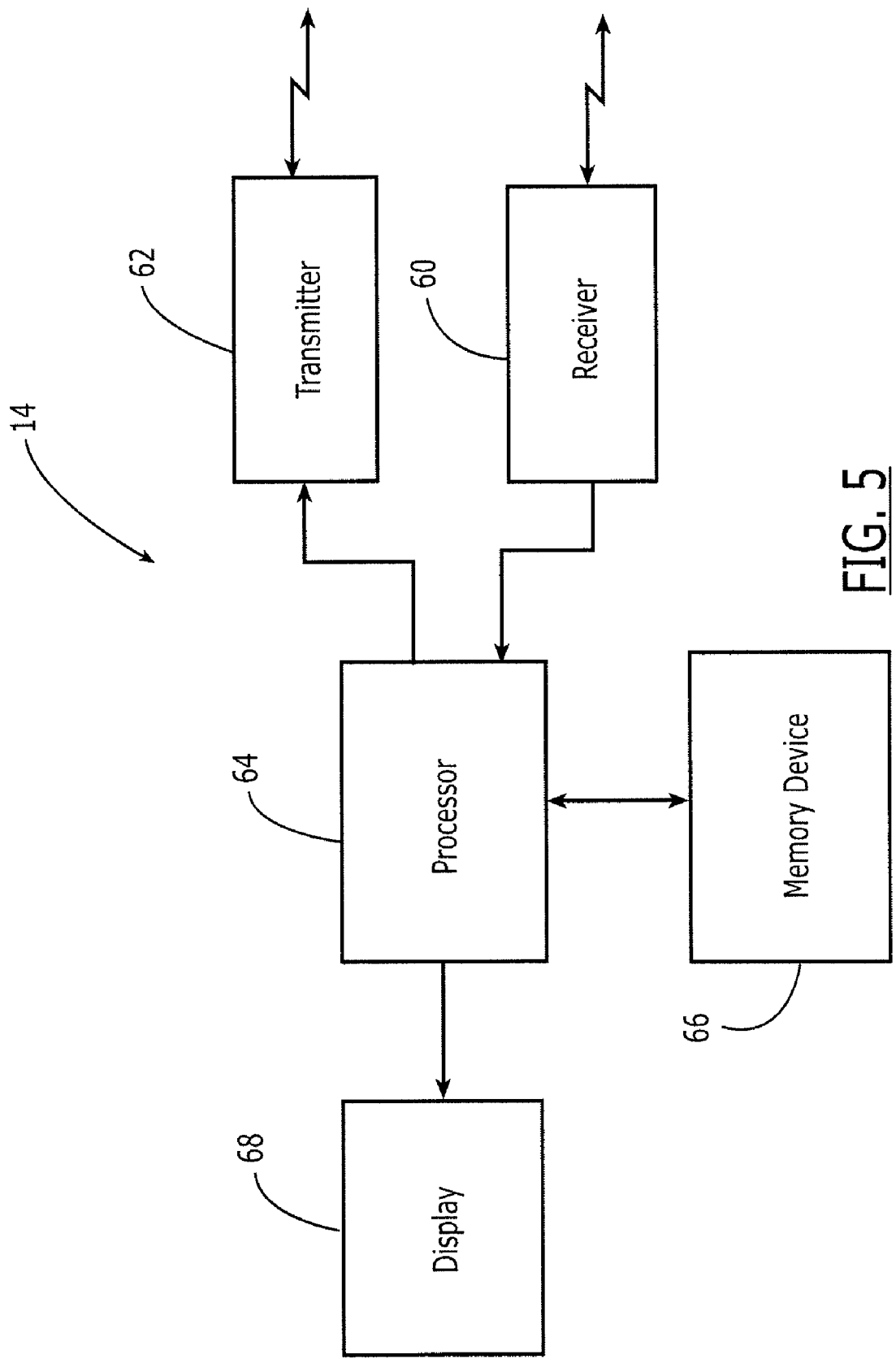
FIG. 5 is a block diagram of a remote cargo maintenance system according to one embodiment of the present invention.

As shown in FIG. 5, the cargo management system 14 also generally includes a receiver 60 and a transmitter 62 for communicating with a plurality of delivery vehicles 12. In this regard, the cargo management system may be configured to communicate with the delivery vehicles via a network, such as a wireline network, a wireless network or the like. As will be apparent, the receiver is configured to receive signals from the delivery vehicles, while the transmitter is configured to transmit signals to the delivery vehicles.

The cargo management system 14 also includes a processor 64, such as a computer, a server or other type of computing device, for receiving the signals from the receiver 60, such as from the delivery vehicles 12, and for providing signals to the transmitter 62 for transmission to the delivery vehicles. The processor is also configured to appropriately analyze or otherwise process the information, as described below. In this regard, the processor of the cargo management system may be configured to receive information from the delivery vehicles that identifies the goods that have been loaded upon the delivery vehicle. In instances in which the processor 24 of a delivery vehicle tracking system 20 has compared the goods which have been loaded upon the delivery vehicle to the cargo manifest and has produced a report, e.g., an exception report, identifying those goods that are listed by the cargo manifest have not been loaded upon the delivery vehicle (and/or those goods that have been loaded upon the delivery vehicle but are not on the cargo manifest), the processor of the cargo management system may also be configured to receive and store the report. Alternatively, the cargo management system may maintain the cargo manifest for the respective delivery vehicles and may make an independent comparison of the goods that have been loaded upon the respective delivery vehicles to the respective cargo manifest for purposes of creating a report identifying the goods listed by the cargo manifest that have not been loaded upon the respective delivery vehicles (and/or those goods that have been loaded upon the delivery vehicle but are not on the cargo manifest).

Figure 6:
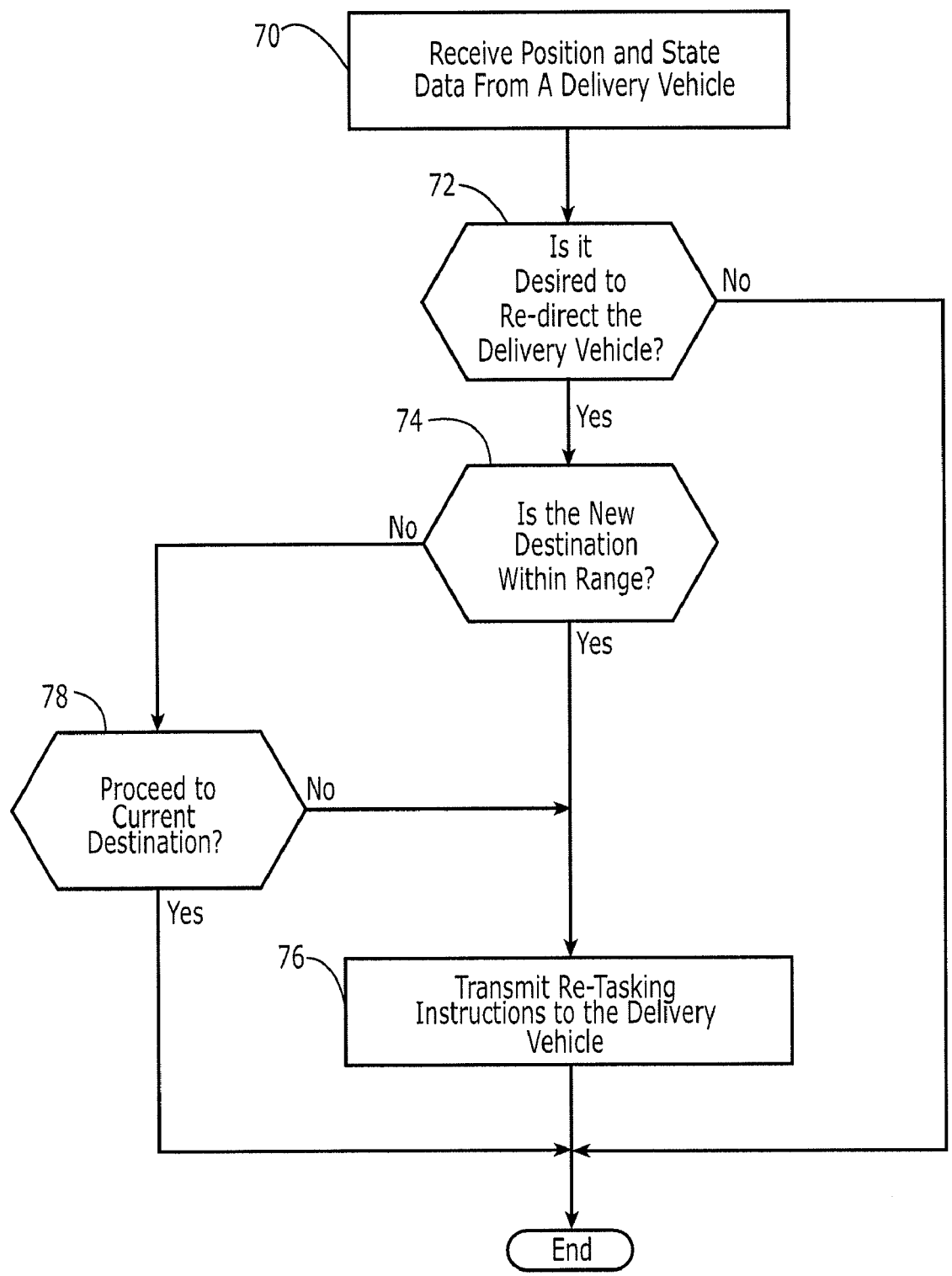
FIG. 6 is a flowchart of the operations performed by a remote cargo management system in accordance with one embodiment of the present invention.

As indicated by block 70 of FIG. 6 which depicts the operations performed by the cargo management system 14 in accordance with one embodiment, the processor 64 of the cargo management system is also configured to receive position data identifying the current position of the delivery vehicle 12 and state data identifying the current state of the delivery vehicle. The processor of the cargo management system may store the position and state data in a memory device 66 associated therewith. As shown in FIG. 5, the cargo management system can also include a display 68 that is configured to be driven by the processor based upon the position data provided by the respective delivery vehicles such that the processor can direct the display to present a map as well as indicia identifying the relative locations of the delivery vehicles, and in one embodiment, the paths traveled along the delivery routes by the respective delivery vehicles.

Although the delivery vehicles 12 typically have a predefined route to be followed in order to deliver the goods to one or more intended destinations, the cargo management system 14 may receive information that would cause it to be desirable for the delivery vehicles to be redirected to a different or additional destination. See block 72 of FIG. 6. In one embodiment, for example, the delivery vehicles may be helicopters that are delivering supplies to military units in the field. Following the initial provision of the routes to the delivery vehicles, the military units may have been redeployed or otherwise moved to another location. The military units may be in communication with the cargo management system for providing updated position information identifying the current location of the military unit or the estimated location of the military units at the time of anticipated arrival of the delivery vehicle. In instances in which the position of the military units has changed from the location at which the delivery vehicle was scheduled to deliver the goods, the cargo management system and, in particular, the processor 64 of the cargo management system may generate re-tasking instructions which redirect the delivery vehicle to the updated location of the military units such that the goods may be properly delivered.

However, the cargo management system 14 does not generally automatically generate the re-tasking instructions and provide the re-tasking instructions to the delivery vehicle 12. Instead, the processor 64 of the cargo management system advantageously considers the state data of the delivery vehicle prior to generating the re-tasking instructions in order to ensure that the delivery vehicle can safely appropriately be re-directed to the updated position of the military unit. For example, the processor of the cargo management system may be configured to determine the remaining range of the delivery vehicle based upon the weight of the delivery vehicle and the remaining fuel onboard the delivery vehicle. The processor may then compare the remaining range of the delivery vehicle to the distance from the current position of the delivery vehicle to the updated position of the military unit to ensure that the delivery vehicle can safely transport the goods to the updated position of the military unit without running out of fuel. In instances in which the delivery vehicle will be unable to be refueled at the destination, i.e., the updated position of the military unit, the processor of the cargo management system may compare the remaining range of the delivery vehicle not only to the distance from the current position of the delivery vehicle to the updated position of the military unit, but to the sum of the distance from the current position of the delivery vehicle to the updated position of the military unit as well as the distance from the updated position of the military unit to a refueling station.

In instances in which the processor 64 of the cargo management system 14 determines that the updated position of the military unit is within the range of the delivery vehicle 12, the processor, in combination with the transmitter 62, can transmit re-tasking instructions to the delivery vehicle to provide an updated delivery route to the updated position of the military unit. See, for example, blocks 74 and 76 of FIG. 6. Alternatively, if the processor of this embodiment of the cargo management system determines that the updated position is not within the range of the delivery vehicle, the processor then determines if the delivery vehicle should continue to its original destination. See block 78 of FIG. 6. In instances in which, for example, a military unit has moved from the original destination, it may no longer be desirable for the delivery vehicle to travel to the original destination such that the processor may again issue re-tasking instructions to the delivery vehicle that eliminate the original destination from the route such that the delivery vehicle either returns to its base (in the instance in which the only remaining destination along the route was the outdated destination) or the delivery vehicle continues more directly to the other destinations along its route.

In either instance, the delivery vehicle tracking system 20 and, in particular, the processor 24 in combination with the receiver 22 are configured to receive and implement any re-tasking instructions from the cargo management system 14 in order to implement any new route. See block 48 of FIG. 4. Once at the destination, the reader unit 30 can again identify the cargo as the cargo is unloaded from the delivery vehicle 12. See block 50 of FIG. 4. Based upon the information provided by the reader unit regarding the cargo that is unloaded, the processor can determine that all of the cargo to be unloaded at the destination is actually unloaded, while also insuring that no cargo that is not intended to be unloaded at the destination is inadvertently unloaded. While the consideration of the remaining fuel has been described above as an example of the state data, the cargo management system can consider other types of state data prior to issuing re-tasking instructions. For example, the processor may consider the configuration of the delivery vehicle to determine if the delivery vehicle is appropriately configured to service the potentially new destination. For example, if it is desired that a pallet be loaded onto the delivery vehicle at the potential new destination, the processor may determine if the delivery vehicle includes an appropriate pallet loading system in order to be capable of loading the pallet prior to issuing the re-tasking instructions.

As such, the cargo load and visibility system 10 of one embodiment of the present invention facilitates the last stage of shipping operation to ad-hoc destinations that are subject to change following loading and departure of the delivery vehicle 12. By providing state data from the delivery vehicle to the cargo management system 14, however, the processor 64 of the cargo management system can make intelligent decisions regarding the ability to re-direct the delivery vehicle in order to deliver the goods to an intended destination that has moved so as to provide for an efficient and timely delivery of the goods in a safe manner by ensuring that delivery vehicle has sufficient fuel to be re-directed to the updated position of the destination of the goods.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A cargo load and visibility system comprising:
    a delivery vehicle tracking system comprising:
        a reader unit mounted upon the delivery vehicle and configured to identify cargo as the cargo is loaded on or unloaded from the delivery vehicle;
        a processor configured to receive information from the reader unit identifying the cargo loaded on or unloaded from the delivery vehicle to permit a determination of the cargo currently onboard the delivery vehicle; and
        a transmitter, in communication with the processor, configured to transmit information regarding a position of the delivery vehicle and state data including information from which an amount of fuel carried by the delivery vehicle or a remaining range of the delivery vehicle is determinable; and
    a remote cargo management system comprising:
        a receiver configured to receive the information from the transmitter of the delivery vehicle;
        a processor configured, in response to a change in an intended destination of the delivery vehicle from an original destination to an alternate destination, to determine at least partially based upon the state data whether the delivery vehicle is currently capable of servicing the alternate destination; and
        a transmitter configured to transmit re-tasking instructions to the delivery vehicle in order to redirect the delivery vehicle to the alternate destination in an instance in which the processor of the remote cargo management system determines that the delivery vehicle is currently capable of servicing the alternate destination.

2. A cargo load and visibility system according to claim 1 wherein the processor of the remote cargo management system is configured to determine if the alternate destination is within the remaining range of the delivery vehicle based upon the state data and, if the alternate destination is within the remaining range of the delivery vehicle, to direct said transmitter of the remote cargo management system to transmit the re-tasking instructions redirecting the delivery vehicle to the alternate destination.

3. A cargo load and visibility system according to claim 1 wherein said transmitter of the delivery vehicle tracking system is further configured to transmit at least one of a mission phase, weight or remaining fuel of the delivery vehicle.

4. A cargo load and visibility system according to claim 1 wherein said reader comprises a contactless reader.

5. A cargo load and visibility system according to claim 1 wherein the remote cargo management system further comprises a display configured to present a map and indicia indicating the position of the delivery vehicle.

6. A cargo load and visibility system according to claim 1 wherein said processor is further configured to receive a cargo manifest identifying the cargo to be carried by the delivery vehicle and to determine any discrepancy between the cargo manifest and the cargo currently onboard the delivery vehicle based upon the information provided by the reader unit.

7. A cargo load and visibility system according to claim 1 wherein said processor is further configured to provide information regarding placement of the cargo upon the delivery vehicle based upon the cargo manifest.

8. A cargo load and visibility system according to claim 1 wherein the delivery vehicle comprises a loading ramp, and wherein the reader unit is positioned in an overhead position proximate the loading ramp.

9. A method according to claim 1 wherein the processor of the remote cargo management system is configured to determine if the delivery vehicle is equipped with a loading system required to handle the cargo at the alternate destination and, if the delivery vehicle is equipped with the loading system required to handle the cargo, to direct said transmitter of the remote cargo management system to transmit the re-tasking instructions redirecting the delivery vehicle to the alternate destination.

10. A delivery vehicle tracking system comprising:
    a reader unit mounted upon the delivery vehicle for identifying cargo as the cargo is loaded on or unloaded from the delivery vehicle;
    a processor for receiving a cargo manifest identifying the cargo to be carried by the delivery vehicle and information from the reader unit identifying the cargo loaded on or unloaded from the delivery vehicle, said processor configured to determine any discrepancy between the cargo manifest and the cargo currently onboard the delivery vehicle based upon the information provided by the reader unit;
    a transmitter, in communication with the processor, for transmitting information regarding a position of the delivery vehicle and state data including information from which an amount of fuel carried by the delivery vehicle or a remaining range of the delivery vehicle is determinable; and
    a receiver configured to receive re-tasking instructions that redirect the delivery vehicle from an original destination to an alternate destination, the re-tasking instructions being at least partially based upon the state data provided by said transmitter that indicates that the delivery vehicle is currently capable of servicing the alternate destination.

11. A delivery vehicle tracking system according to claim 10 wherein said transmitter is further configured to transmit at least one of a mission phase, weight or remaining fuel of the delivery vehicle.

12. A delivery vehicle tracking system according to claim 10 wherein said reader unit comprises a contactless reader unit.

13. A delivery vehicle tracking system according to claim 10 wherein said processor is configured to provide information regarding placement of the cargo upon the delivery vehicle based upon the cargo manifest.

14. A delivery vehicle tracking system according to claim 10 wherein the delivery vehicle comprises a loading ramp, and wherein the reader unit is positioned in an overhead position proximate the loading ramp.

15. A delivery vehicle tracking system according to claim 10 wherein the receiver is configured to receive the re-tasking instructions that redirect the delivery vehicle from the original destination to the alternate destination in an instance in which the state data provided by the transmitter indicates that the alternate destination is within the remaining range of the delivery vehicle.

16. A delivery vehicle tracking system according to claim 10 wherein the receiver is configured to receive the re-tasking instructions that redirect the delivery vehicle from the original destination to the alternate destination in an instance in which the state data provided by the transmitter indicates that the delivery vehicle is equipped with a loading system required to handle the cargo at the alternate destination.

17. A method for tracking cargo comprising:
identifying cargo with a reader unit mounted upon a delivery vehicle as the cargo is loaded on or unloaded from the delivery vehicle;
determining the cargo currently onboard the delivery vehicle based upon the cargo identified by the reader unit as the cargo is loaded on or unloaded from the delivery vehicle;
determining any discrepancy between a cargo manifest and the cargo currently onboard the delivery vehicle based upon the information provided by the reader unit;
transmitting information regarding a position of the delivery vehicle and state data including information from which an amount of fuel carried by the delivery vehicle or a remaining range of the delivery vehicle is determinable; and
receiving re-tasking instructions that redirect the delivery vehicle from an original destination to an alternate destination, the re-tasking instructions being at least partially based upon the state data that indicates that the delivery vehicle is currently capable of servicing the alternate destination.

18. A method according to claim 17 wherein transmitting information comprises transmitting at least one of a mission phase, weight or remaining fuel of the delivery vehicle.

19. A method according to claim 17 wherein identifying the cargo with a reader unit comprises identifying the cargo in a contactless manner with the reader unit.

20. A method according to claim 17 further comprising providing information regarding placement of the cargo upon the delivery vehicle based upon the cargo manifest.

21. A method according to claim 17 further comprises identifying the cargo unloaded upon reaching a destination of the delivery vehicle.

22. A method according to claim 17 wherein receiving the re-tasking instructions comprises receiving the re-tasking instructions that redirect the delivery vehicle from the original destination to the alternate destination in an instance in which the state data indicates that the alternate destination is within the remaining range of the delivery vehicle.

23. A method according to claim 17 wherein receiving the re-tasking instructions comprises receiving the re-tasking instructions that redirect the delivery vehicle from the original destination to the alternate destination in an instance in which the state data indicates that the delivery vehicle is equipped with a loading system required to handle the cargo at the alternate destination.

* * * * *